(12) United States Patent
Hammack et al.

(10) Patent No.: US 7,903,000 B2
(45) Date of Patent: Mar. 8, 2011

(54) REPRESENTING A HOLDING PATTERN ON A VERTICAL SITUATION DISPLAY

(75) Inventors: Jason L. Hammack, Seattle, WA (US); Peter D. Gunn, Bellevue, WA (US); Michael Jefferie Tucker, Lake Stevens, WA (US); Sherwin Shye-Min Chen, Bellevue, WA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 496 days.

(21) Appl. No.: 12/111,736

(22) Filed: Apr. 29, 2008

(65) Prior Publication Data

US 2009/0267800 A1 Oct. 29, 2009

(51) Int. Cl.
*G01C 21/00* (2006.01)
(52) U.S. Cl. ......... 340/974; 340/945; 340/971; 340/976; 701/14

(58) Field of Classification Search .................. 340/945, 340/980, 971–979, 970; 701/8, 14, 18
See application file for complete search history.

(56) References Cited

U.S. PATENT DOCUMENTS

| | | | | |
|---|---|---|---|---|
| 3,816,716 | A * | 6/1974 | De Garmo | 701/204 |
| 6,112,141 | A * | 8/2000 | Briffe et al. | 701/14 |
| 6,154,151 | A * | 11/2000 | McElreath et al. | 340/970 |
| 6,633,810 | B1 * | 10/2003 | Qureshi et al. | 701/206 |
| 6,995,690 | B1 | 2/2006 | Chen et al. | |
| 7,209,070 | B2 | 4/2007 | Gilliland et al. | |
| 7,370,790 | B2 * | 5/2008 | Martincikova et al. | 235/61 NV |
| 2006/0004496 | A1 | 1/2006 | Tucker et al. | |
| 2006/0005147 | A1 | 1/2006 | Hammack et al. | |

* cited by examiner

*Primary Examiner* — Brent Swarthout
(74) *Attorney, Agent, or Firm* — Lee & Hayes, PLLC (57) ABSTRACT

Techniques for representing a holding pattern on a vertical situation display are described. The vertical situation display has a first screen area to depict the holding pattern and second screen area to show a flight path after the holding pattern. The representation of the holding pattern visually informs a flight crew of current and prospective flight conditions.

20 Claims, 5 Drawing Sheets

REPRESENTING A HOLDING PATTERN ON A VERTICAL SITUATION DISPLAY

FIELD OF THE INVENTION

The field of the present disclosure relates to flight deck systems of aircraft, and more particularly, to representing flight plans on displays.

BACKGROUND

During the flight of an aircraft, there may be any number of factors that adversely affect the safety and effectiveness of air travel, such as changes in terrain, poor weather, or congested air traffic. Often, an aircraft pilot may not fully appreciate or perceive the nature or potential impact of these factors. Various flight control instruments have been developed over the years to aid the pilot in safely and effectively negotiating such factors.

Two common tools in use today are a navigational display and a vertical situation display. The navigational display presents a lateral navigational view of the flight plan, while the vertical situation display presents a vertical navigational view of the flight plan. The pilot uses the navigational display and vertical situation display to make navigational and other control decisions.

During the flight of an aircraft, it may be necessary for the aircraft to fly in a holding pattern. A holding pattern is a repetitive maneuver that keeps an aircraft in a specified airspace. An aircraft pilot may use various flight instruments to make control decisions while flying a holding pattern maneuver. In some cases, an aircraft pilot may not fully appreciate different factors which may be present while engaged in flying a holding pattern maneuver. Due to these difficulties, there may be times when pilots need a more accurate representation of flight conditions while flying a holding pattern maneuver.

There remains an ongoing need in the aviation industry for further improvements and refinements to make flight operation more effective and safe. More particularly, there may be times when pilots could use enhanced representation of flight conditions during execution of various flight maneuvers. Therefore, it is desirable to find better ways to convey navigational status of an aircraft during flight maneuvers.

SUMMARY

Techniques for representing a holding pattern on a vertical situation display are described. The vertical situation display has a first screen area to depict the holding pattern and second screen area to show a flight path after the holding pattern. The representation of the holding pattern visually informs a flight crew of current and prospective flight conditions.

In various implementations, a user interface for an aircraft control display includes a navigational display to depict a lateral navigational configuration of a flight plan, the flight plan may include a holding pattern. The aircraft control display may further include a vertical situation display (VSD) to depict a vertical navigational configuration of the flight plan. The VSD may have a first screen area to show the holding pattern and/or a second screen area to show a flight path outside of the holding pattern.

In other implementations, a system is described as having a flight management computer (FMC) to compute a flight plan with a holding pattern. The system includes a display module to display the flight plan computed by the FMC. The display module may include a navigational display to display a lateral navigational configuration of the flight plan and/or a vertical situation display (VSD) to display a vertical navigational configuration of the flight plan, wherein the VSD represents a holding pattern.

In still other implementations, a method is provided that includes displaying a flight plan of an aircraft on a display module, where the display module has a navigational display and/or a vertical situation display (VSD). The method further includes representing, on the navigational display, a holding pattern as a part of a lateral navigational configuration of the flight plan and/or representing, on the VSD, the holding pattern as a part of a vertical navigational configuration of the flight plan.

The features, functions, and advantages that have been discussed above or will be discussed below can be achieved independently in various implementations, or may be combined in yet other implementations, further details of which can be seen with reference to the following description and drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to representation of holding patterns on flight display modules, and particularly, on vertical situation displays (or "VSDs"). A VSD graphically illustrates an aircraft's flight path by presenting a profile, or side view, of the aircraft as it flies vertically above underlying terrain. A VSD enhances a flight crew's overall situation awareness during controlled flight over the terrain, particularly during approach and landing, thereby helping to prevent accidents. To further aid the flight crew's understanding of flight conditions, holding patterns are also represented on the VSD. The holding pattern is pictorially represented on the VSD, as well as the flight path following exit of the holding pattern. Visual cues, words, and other indicia may be used to convey the holding pattern situation to the flight crew.

Representation of a holding pattern on a VSD may be implemented in a number of ways. One example implementation is provided with reference to the following figures, as described below in more detail.

Example System Architecture

Figure 1:
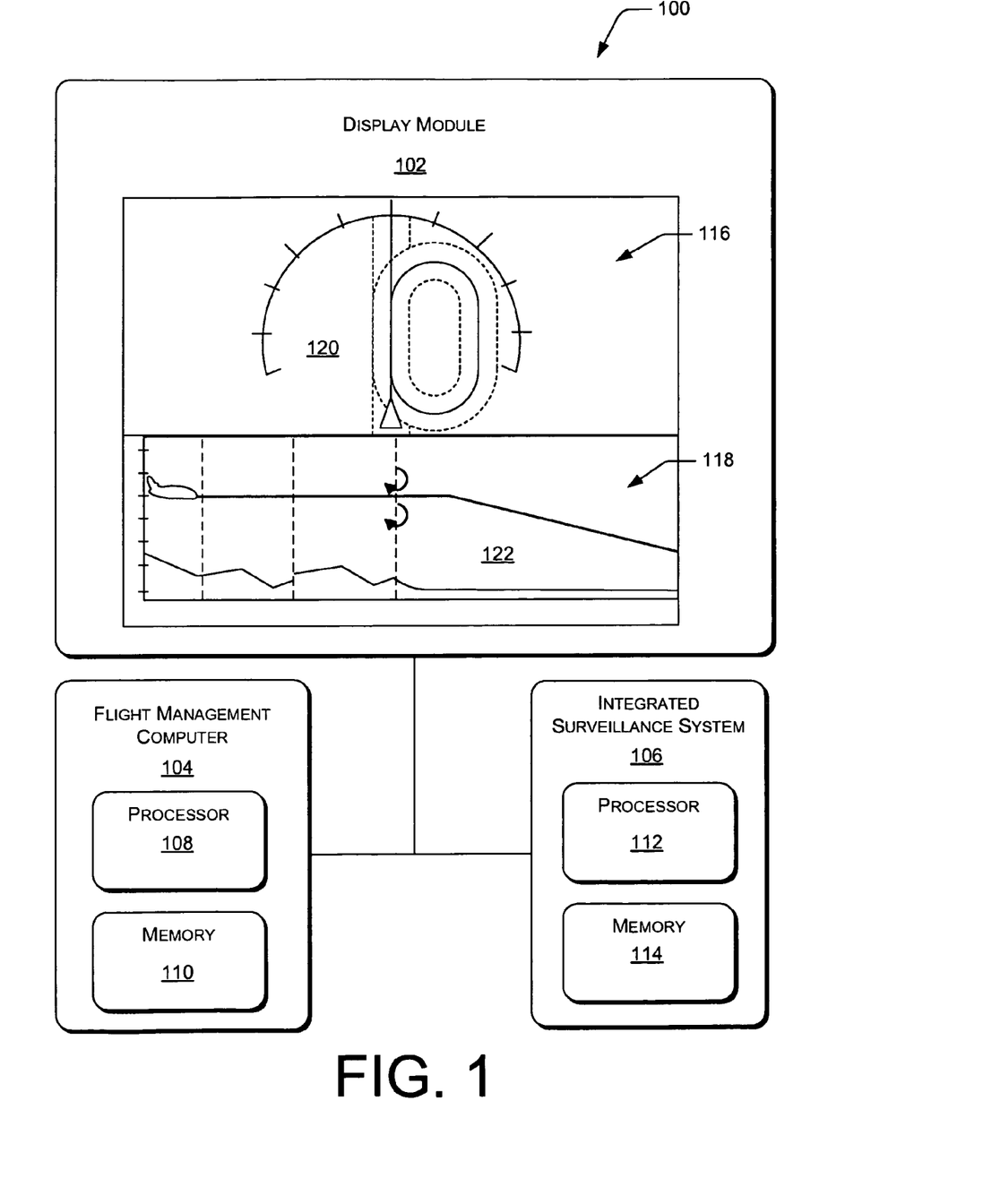
FIG. 1 illustrates a block diagram of a flight deck system having a display module to represent flight plans that include a holding pattern.

FIG. 1 illustrates an exemplary implementation of a flight deck system 100 employed in an aircraft (not illustrated). The flight deck system 100 includes a display module 102, a flight management computer (FMC) 104, and an integrated surveillance system (ISS) 106. These various components are communicatively coupled to one another through wire-based or wireless communication paths.

The flight deck system 100 provides flight plans to the aircraft crew. The display module 102 is typically located in the aircraft control panel for easy viewing by the one or more pilots. There may be multiple display modules 102 as a part of the flight deck 100, although only one is shown in FIG. 1 for discussion purposes. The display module 102 may be implemented using any number of display technologies, such as LCD (liquid crystal display) screens, OLED (organic light emitting diodes), CRT (cathode ray tubes) monitors, and so forth.

The FMC 104 as illustrated in FIG. 1 includes a processor 108 coupled to a memory 110. The processor 108 computes a flight plan based on data from the FMC 104 and the memory 110. The memory 110 may further store a database that holds flight path data, terrain data, weather data, pre-planned flight maneuver data and other data for calculating flight plans. The processor 108 determines when a holding pattern is to be flown based on data provided from the memory 110. Depending upon implementations, the FMC 104 may be disposed on an aircraft with the display module 102 or may be disposed remotely and be in wireless communication with the display module 102.

The ISS 106 includes a processor 112 coupled to a memory 114. The memory 114 may further store a database that includes terrain data, weather data, traffic data, and global positioning data. In one implementation the database of the ISS 106 provides data to the FMC 104. The ISS 106 may be disposed on an aircraft with the display module 102 and/or the FMC 104. Alternatively, the ISS 106 may be disposed remotely and be in wireless communication with the FMC 104 and/or the display module 102.

The memories 110 and 114 may include an operating system, one or more application programs for implementing flight plan computations, as well as various other data, programs, media, and the like. The memories 110 and 114 may be implemented as any number of various computer-readable storage media, such as volatile memory (e.g., random access memory (RAM)) and non volatile memory (e.g., read only memory (ROM), flash, disk, etc.).

The display module 102 includes a navigational display 116 and a vertical situation display (VSD) 118. As shown in this implementation, the navigational display 116 is juxtaposed elevationally above the VSD 118. The navigational display 116 presents a lateral navigational configuration 120 of the flight plan. The VSD 118 presents a vertical navigational configuration 122 of the flight plan. Together, the navigational display 116 and the VSD 118 provide a user interface that visually conveys the navigational status of an aircraft during flight maneuvers according to a particular flight plan. In one implementation, a holding pattern is included in the illustrated flight plan. The user interface afforded by the displays 116 and 118 are described below in more detail.

Examples of User Interfaces

Figure 2:
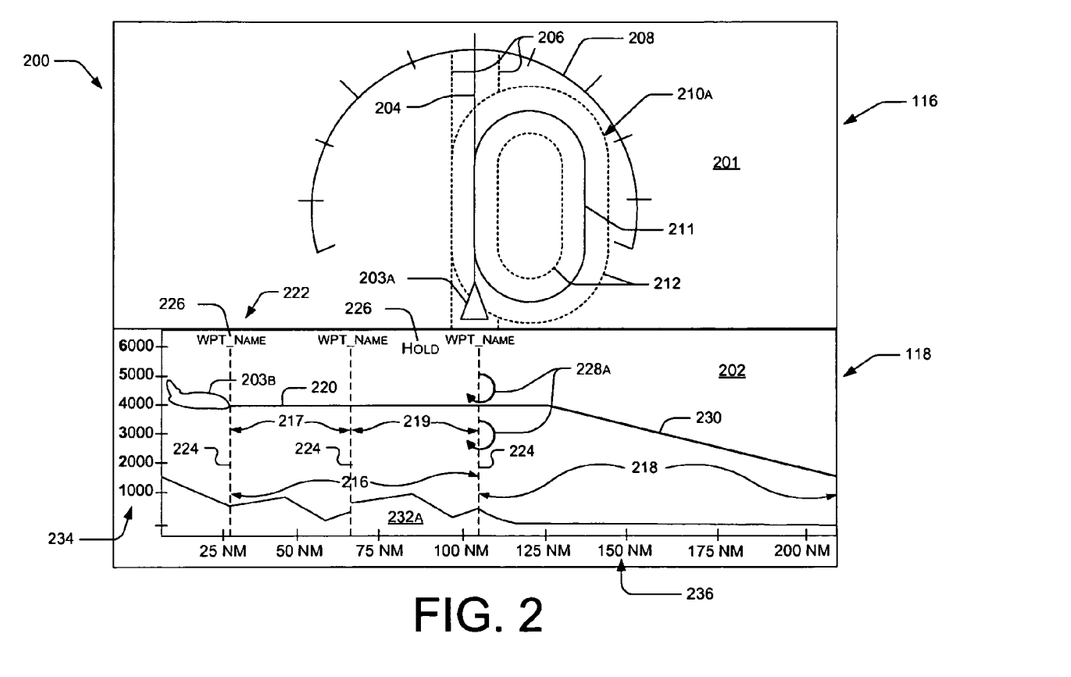
FIG. 2 illustrates a graphical representation depicted on the display module shown in FIG. 1 to show a first example of a holding pattern on a vertical situation display.

FIG. 2 illustrates a graphical representation of a user interface 200 depicted on the display module 102 of FIG. 1 in accordance with one possible implementation. In the user interface 200, the navigational display 116 is disposed at an upper portion of the display module 102 and the VSD 118 is disposed at a lower portion. The navigational display 116 represents a lateral navigational configuration 201 for an aircraft's flight plan. The VSD 118 represents a vertical navigational configuration 202 for an aircraft's flight plan.

The navigational display 116 includes an iconic representation of an aircraft (aircraft icon) 203A. The VSD 118 includes another iconic representation of an aircraft (aircraft icon) 203B. The aircraft icons 203A and 203B may be any shape, symbol, and/or text to represent the aircraft. According to one implementation, the aircraft icon 203A is oriented in the direction of a projected flight path 204. The projected flight path 204 may be a line which extends from the aircraft icon 203A to indicate the aircraft's projected direction of travel. The navigational display 116 includes a terrain swath 206, which is graphically represented as a pair of dotted or broken lines disposed on opposing sides of the projected flight path 204. The terrain swath 206 indicates a region of terrain being represented on the VSD 118. Different widths of the terrain swath 206 may be depicted, and this may be set automatically or as a user defined parameter. The navigational display 116 further includes a directional key 208, which is illustrated here as a partially circular shape. The directional key 208 in conjunction with the projected flight path 204 and the terrain swath 206 provides graphical assistance to flight crew during the navigation of an aircraft. In one implementation, the direction key 208 is configured as a compass such that the point at which the projected flight path 204 intersects the direction key 208 indicates the heading of the aircraft. Additionally, as a flight crew alters an aircraft course heading, the directional key 208 correspondingly indicates in real-time the directional change of the aircraft like a compass.

The projected flight path 204 may include a holding pattern 210A, which is graphically represented on the navigational display 116 as a shape or path of the intended course prescribed by the holding pattern. In FIG. 2, the holding pattern 210A is exhibited as an annular or oval shape. The holding pattern 210A includes a central flight path 211 along which the aircraft will follow during execution of the holding pattern. The holding pattern 210A also includes a holding pattern terrain swath 212, which is visually shown as dotted lines disposed on opposing sides of the flight path 211. The holding pattern terrain swath 212 indicates the region of terrain represented on the VSD 118.

It is envisioned that the holding pattern 210A may take on any shape or form on the navigational display 116. Different widths of holding pattern terrain swaths 212 may be depicted. Further, the holding pattern terrain swath 212 may be different in width and appearance than the terrain swath 206 along the flight path outside of the holding pattern. A user may selectably configure the widths of the holding pattern terrain swath 212.

According to one implementation, the VSD 118 of FIG. 2 includes a first screen area 216 and a second screen area 218. The first screen area 216 is located to the left of the second screen area 218, and both areas reside beneath the navigational display 116. According to one implementation, the first screen area 216 of the VSD 118 depicts an unwound flight path 220 of the holding pattern 210A. In an alternative implementation, the first screen area includes an entry maneuver 217 and a hold maneuver 219. In one implementation, the entry maneuver 217 is disposed to the left of the hold maneuver 219. The first screen area 216 includes one or more hold fixes 222 that represent one or more waypoints along the holding pattern 210A. Waypoints are points in space with designated sets of coordinates for the purpose of navigation. The hold fixes 222 are waypoints bearing a relationship to designated locations along a holding pattern. The hold fixes 222 include one or more anchor lines 224 and hold mode indicia 226. According to one implementation, the anchor lines 224 of the hold fix 222 extends vertically through the first screen area 216 of the VSD 118 and intersects the unwound flight path 220. Each anchor line 224 may be a certain color, pattern, and/or weight to indicate a type and/or status of the hold fix 222. The hold mode indicia 226 of each hold fix 222 uses words, alphanumeric characters, symbols, or other intelligible markings to additionally convey the type and/or status of respective hold fix 222. For example, according to one implementation, the hold mode indicia 226 may identify the hold fix 222 by a waypoint name: "WPT_Name" as shown in FIG. 2. Additionally, the hold mode indicia may identify the hold fix 222 as "HOLD" as shown in the hold maneuver 219 of the first screen area 216. The anchor line 224 and the hold mode indicia 226 may represent an initial hold fix, an entry fix, a final hold fix and/or any other type of hold fix known in the related field of technology.

One or more hold fixes 222 may include a hold return indicia 228A to represent an instruction to repeat the holding pattern 210A. In some cases, the hold return indicia 228A represent an instruction to repeat the same holding pattern 210A as was previously flown, while in other cases, different hold return indicia 228A represent an instruction to continue into a holding pattern of an alternative configuration. Accordingly, a variety of different hold return indicia 228A may be used.

In FIG. 2 the second screen area 218 of the VSD 118 includes a planned flight path 230 that occurs outside of the hold pattern 210A in the first screen area 216. In one implementation, the flight path occurs outside, whether before or after, the entry maneuver 217 and the hold maneuver 219 in the first screen area 216. In an alternative implementation, the planned flight path 230 may include flight path before initiation of the holding pattern 210A and flight path after completion of the holding pattern 210A. The planned flight path 230 is reconfigured to reflect necessary and/or required changes to the flight plan determined by the FMC 104. The planned flight path 230 may be represented by different colors, patterns and/or line weights to indicate a type of flight maneuver and/or the status of the planned flight path 230.

As illustrated in FIG. 2, the VSD 118 includes a graphical representation of a land terrain profile 232A. According to one implementation, the land terrain profile 232A is generated based on global position system data and topographical data generated and provided by the ISS 106 and the FMC 104. In one implementation, the land terrain profile 232A includes a cross-sectional view of terrestrial and aquatic features that reside elevationally below the aircraft within the terrain swaths 206 and 212 represented on the navigational display 116. The land terrain profile 232A is shown to enable a flight crew of an aircraft to assess the vertical situation of an aircraft relative to terrestrial and aquatic features. As illustrated in FIG. 2, the land terrain profile 232A depicted in the entry maneuver 217 and hold maneuver 219 are substantially the same because the entry maneuver 217 and hold maneuver 219 may occur over substantially the same terrain.

The VSD 118 further includes a vertical gradation index 234 and a track distance index 236. In some aspects, the vertical gradation index 234 represents an altitude scale for referencing the location of an aircraft relative to terrain, the unwound flight path 220, and/or the planned flight path 230. According to one implementation, the track distance index 236 represents a range scale using the units of nautical miles (NM) which extends laterally across a lower portion of the VSD 118. The track distance index 236 may be used to judge distances of the unwound flight path 220, the planned flight path 230, the entry maneuver 217 and the hold maneuver 219. The track distance index 236 is scalable to provide various level of detail and/or magnification of the flight paths, 220 and 230 and the entry maneuver 217 and hold maneuver 219.

In one implementation, the vertical navigational configuration 202 is adaptable to represent flight status in real time. Various components of the vertical navigational configuration 202 are continuously updated, such as, for example, the unwound flight path 220, the entry maneuver 217, the hold maneuver 219, the hold fixes 222, the hold mode indicia 226, the hold return indicia 228A and 228B the planned flight path 230 and the land terrain profile 232A are updated in real-time. In one implementation, when the aircraft is commanded to continue cycling through another iteration of the holding pattern or to complete the current holding pattern and begin a new holding pattern, the representation of the vertical navigational configuration 202 "jumps" or resets to show the beginning of a new holding pattern.

Figure 3:
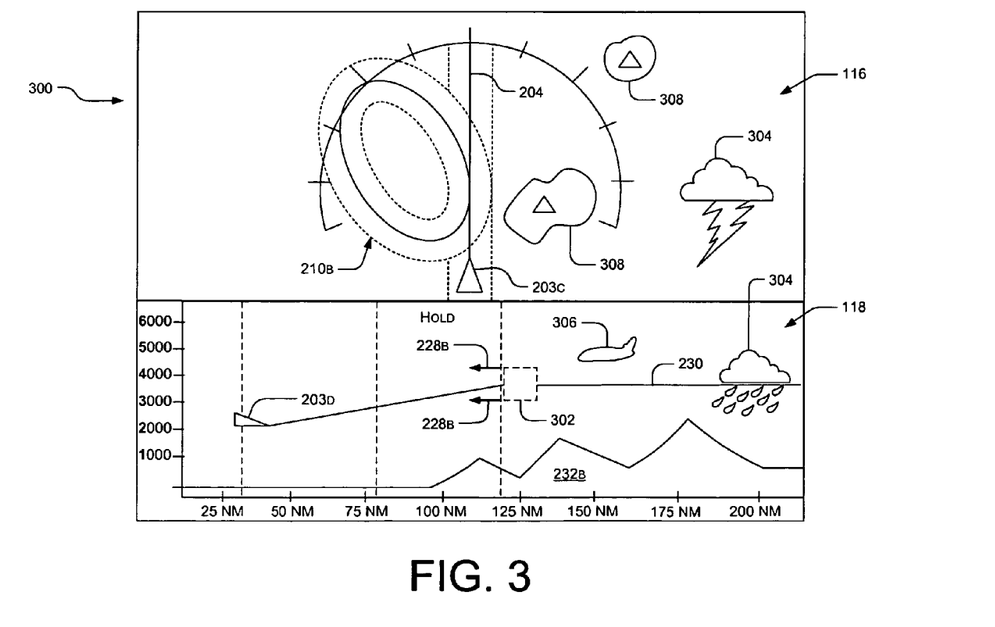
FIG. 3 illustrates a graphical representation depicted on the display module shown in FIG. 1 to show a second example of a holding pattern on a vertical situation display.

FIG. 3 illustrates a graphical representation depicted on the display module 102 shown in FIG. 1 to show a second example of a holding pattern 210B on a VSD 118 and a navigational display 116. The graphical representation may be a user interface 300 depicted on the display module 102 shown in FIG. 1. The user interface 300 is configured to have an upper portion thereof for depicting the navigational display 116 and a lower portion thereof for depicting the VSD 118. According to one implementation, the navigational display 116 and the VSD 118 each account for approximately half of viewable area of the user interface 300. According to an alternative implementation, the viewable area of the user interface 300 occupied by the navigational display 116 and the VSD 118 is changeable according to a users input and/or a pre-programmed instruction.

Additionally, FIG. 3 represents an alternative holding pattern 210B configuration. FIG. 3 illustrates the holding pattern 210B with an oval shape. Further, FIG. 3 shows the holding pattern 210B in an alternative orientation relative to the projected flight path 204. As shown, according to one implementation, the VSD includes a masking symbol 302 which has a square shape and covers a portion of the planned flight path 230. It is envisioned that the masking symbol 302 may be any shape and size. The masking symbol 302 covers a portion of the planned flight path 230 to show a break in the planned flight path 230 so as to indicate that the rest of the planned flight path 230 is not to be flown. The masking symbol 302 is active and masks while continuation of the flight of a holding pattern is commanded. The masking symbol 302 is removed when termination of a holding pattern has been commanded.

It is envisioned that the aircraft icons 203A and 203B of FIG. 2 may be any type of symbol and/or shape. In FIG. 3 there is an aircraft icon 203C in the shape of an isosceles triangle in the navigational display 116 of the user interface 300. There is also an aircraft icon 203D in the shape of a right triangle disposed in VSD 118 of the user interface 300. FIG. 3 includes a hold return indicia 228B which is an illustration of an alternative implementation of the hold return indicia 228A included in FIG. 2. It is envisioned that different hold return indicia 228A and 228B may be used, wherein different hold return indicia 228A and 228B may be designated to signify various instructions with regard to continuing and/or altering a holding pattern 210 being flown.

As illustrated in FIG. 3, the navigational display 116 and the VSD 118 may include weather alert indicia 304. As shown, the weather alert indicia 304 depict cloud symbols with lightening and/or rain symbols. It is envisioned that the weather alert indicia 304 may be any symbol, text and/or shape for conveying any of a variety of weather conditions. It is envisioned that the weather alert indicia 304 convey information which may be necessary to apprise, and enable decisions by, a flight crew of the real-time nature, severity and location of weather conditions within a selected proximity of an aircraft and its flight path.

Further illustrated in FIG. 3, the VSD 118 may include air traffic indicia 306, as represented in the shape of an aircraft. It is noted that the air traffic indicia 306 may be configured to be any symbol, text and/or shape to convey information to apprise, and enable decisions by, a flight crew of the real-time nature, status, and location of air traffic within a selected proximity of an aircraft and its flight path.

In FIG. 3, the navigational display 116 includes terrain-mapping indicia 308. The terrain-mapping indicia 308 are shaped to represent any of a variety of terrain features, and may be formed using symbols, text and/or shapes. It is envisioned that the terrain-mapping indicia 308 convey information to apprise, and enable decisions by, a flight crew pertaining to the character and location of terrain within a selected proximity of an aircraft and its flight path. For example, the terrain-mapping indicia 308 may represent a real-time topographical contour of terrestrial features within a forward directed semicircular region of an aircraft. In one implementation, it is envisioned that the terrain-mapping indicia 308 will at least correspond to a land terrain profile 232B represented in the VSD 118 of the user interface 300.

Operation

Figure 4:
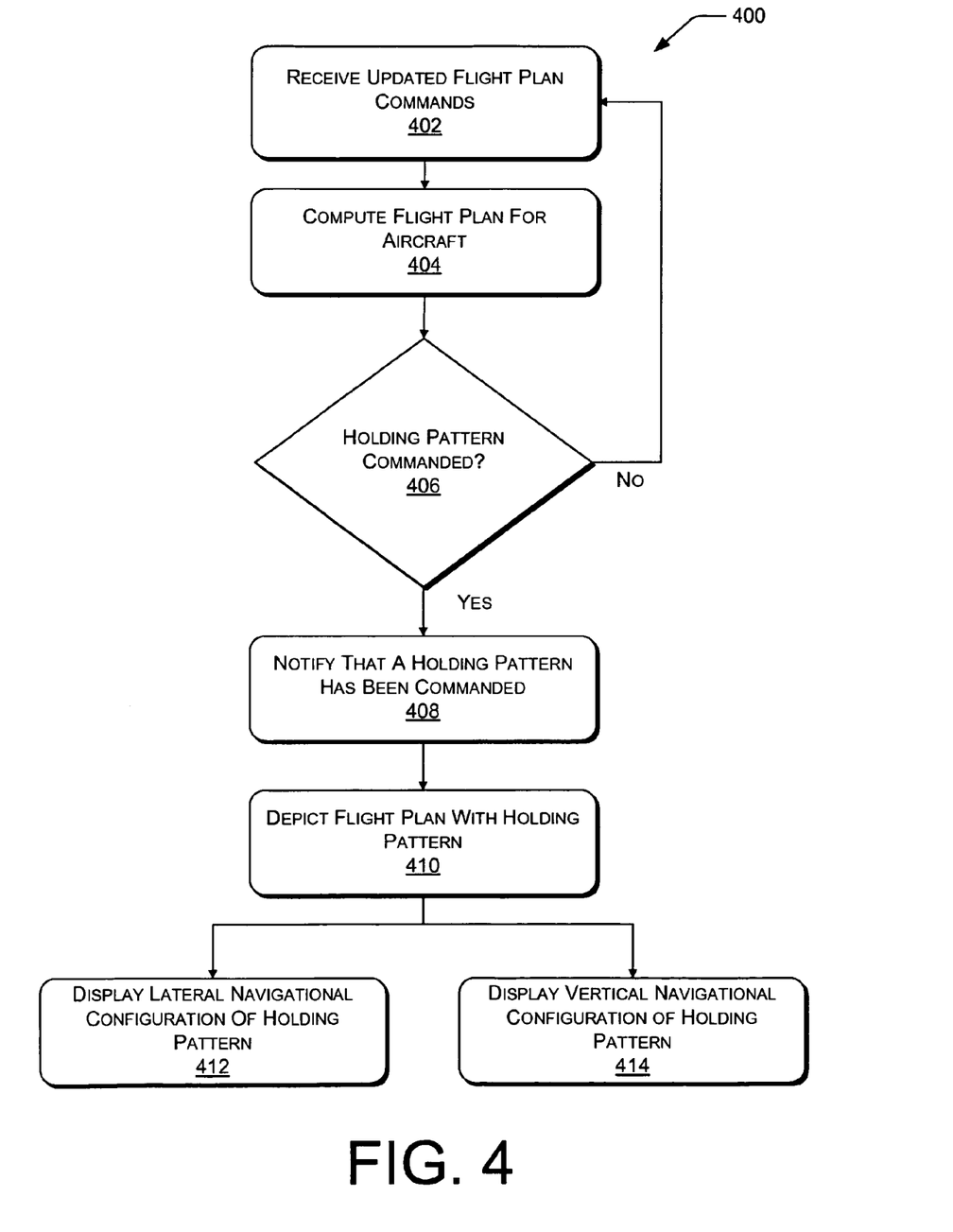
FIG. 4 is a flow diagram of a process for presenting a flight plan, including a holding pattern, on the display module.
Figure 5:
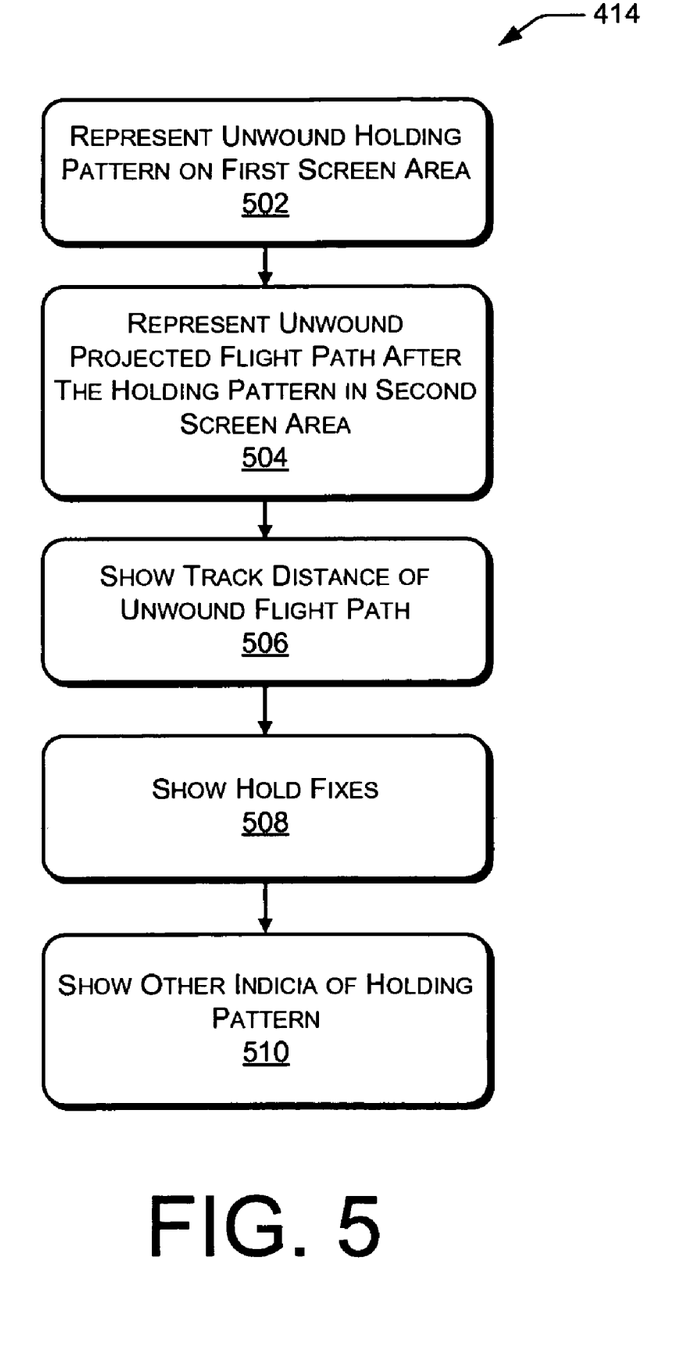
FIG. 5 is a flow diagram of a process for presenting the holding pattern on a vertical situation display.

FIGS. 4 and 5 illustrate example processes for representing a flight plan, including a holding pattern, on a display module that includes a vertical situation display (VSD). Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the system 100 of FIG. 1.

FIG. 4 illustrates a process 400 for representing a flight plan, including a holding pattern, on a display module. At 402, flight plan commands for an aircraft are received. According to one implementation, the flight plan commands are provided by either the FMC 104, the ISS 106 (see FIG. 1), or an air traffic control (not shown).

At 404, a flight plan is computed for the aircraft based on the received flight plan commands. In one implementation, the FMC 104 computes the flight plan. At 406, depending on the flight plan computed, there is a determination whether a holding pattern is part of the flight plan. If a holding pattern 210 is not commanded (i.e., the "no" branch from act 406), an aircraft continues on a pre-directed course and may receive further updated flight plan commands in the future (act 402). If a holding pattern 210 has been commanded (i.e., the "yes" branch from act 406), a notification that a holding pattern 210 has been commanded is provided (act 408). The notification may be in any number of forms, such as audio, visual, and/or tactile feedback. The notification is directed towards a flight crew of an aircraft, an autopilot program, the FMC 104, and/or the ISS 106.

At 410, in response to the notification that a holding pattern 210 has been commanded, a flight plan that includes the holding pattern is depicted on a display module. The depicted flight plan includes an iconic representation of an aircraft, a terrain swath, and a projected flight path. Examples of possible flight plan representations are shown in FIGS. 2 and 3.

At 412, the holding pattern is depicted on the navigational display as a part of a lateral navigational configuration of the flight plan. This is illustrated, for example, in the navigational display 116 in FIGS. 2 and 3. At 414, the holding pattern is further depicted on the vertical situation display (VSD) as part of a vertical navigational configuration of the flight plan. This is illustrated, for example, in the VSD 118 in FIGS. 2 and 3.

FIG. 5 further illustrates the process 414 for displaying a vertical navigational configuration of a holding pattern in more detail. At 502, an unwound holding pattern is represented in a first screen section of the VSD. This is shown, for example, in the area 216 of FIG. 2. At 504, an unwound projected flight path that occurs after the holding pattern is represented in a second screen area of the VSD. This is shown, for example, in the area 218 of FIG. 2.

At 506, the track distance of the unwound flight paths (including the holding pattern) are shown on the VSD. Further, at 508, any hold fixes are also shown on the VSD. At 510, any indicia that help convey the holding pattern in the VSD is shown. As shown in FIG. 2, examples of such indicia include hold mode indicia 226 and hold return indicia 228A and 228A. In one implementation, the process 414 of FIG. 5 is repeated to represent the vertical navigational configuration in real time. In this manner, a different hold mode representation of the vertical navigational configuration may be provided when the aircraft is asked to repeat the current hold pattern or embark on a new one.

CONCLUSION

Although the subject matter has been described in language specific to structural features and/or methodological acts, it is to be understood that the subject matter defined in the appended claims is not necessarily limited to the specific features or acts. While specific implementations have been illustrated and described herein, as noted above, many changes can be made without departing from the spirit and scope of the claims. Accordingly, the scope of the claims should not be limited by the disclosure of the specific implementations set forth above.

What is claimed is:

1. A user interface for an aircraft control display comprising:
    a navigational display depicting a lateral navigational configuration of a flight plan including a holding pattern, the navigational display including a holding pattern terrain swath associated with the holding pattern; and
    a vertical situation display (VSD) depicting a vertical navigational configuration of the flight plan bounded by the holding pattern terrain swath as depicted in the lateral navigational configuration, the VSD having a first screen area to show the holding pattern and a second screen area to show a flight path outside of the holding pattern.

2. The user interface of claim 1, wherein the vertical navigational configuration includes a plurality of waypoints for representing hold fixes as instructions to repeat the holding pattern.

3. The user interface of claim 2, wherein the hold fixes are represented by at least one of symbolic indicia, textual indicia, or an anchor line.

4. The user interface of claim 1, wherein the vertical navigational configuration represents the holding pattern as an unwound flight path.

5. The user interface of claim 4, wherein the unwound flight path includes an entry maneuver and a hold maneuver.

6. The user interface of claim 1, wherein the VSD shows a track distance of the flight plan.

7. The user interface of claim 1, wherein the vertical navigational configuration of the flight plan further comprises an iconic depiction of at least one of terrain, airspace data, weather data, or traffic data.

8. The user interface of claim 1, wherein the vertical navigational configuration of the flight plan further comprises indicia conveying an existence of the holding pattern, the indicia comprised of at least one of a text, a symbol, or a graphic.

9. A system comprising:
  a flight management computer (FMC) to compute a flight plan having a holding pattern;
  a display module to display the flight plan computed by the FMC, the display module comprising:
    a navigational display to display a lateral navigational configuration of the holding pattern, the navigational display including a holding pattern terrain swath associated with the holding pattern; and
    a vertical situation display (VSD) to display a vertical navigational configuration of the holding pattern bounded by the holding pattern terrain swath as depicted in the lateral navigational configuration and to further display a vertical navigational configuration of a portion of the flight plan that occurs after exiting the holding pattern.

10. The system of claim 9, wherein the system further comprises an integrated surveillance system (ISS) to provide information to the FMC.

11. The system of claim 9, wherein the VSD has a first screen area showing the vertical navigational configuration of the holding pattern and a second screen area showing the vertical navigational configuration of a portion of the flight plan that is unrepresented in the navigational display.

12. A method comprising:
  displaying a flight plan of an aircraft on a display module, the display module having a navigational display presenting a lateral navigation configuration of the flight plan and a vertical situation display (VSD) presenting a vertical navigational configuration of the flight plan;
  receiving a hold notification to command the aircraft into a holding pattern;
  representing the holding pattern on the navigational display as a part of the lateral navigational configuration of the flight plan;
  representing the holding pattern on the VSD as a part of the vertical navigational configuration of the flight plan; and
  representing a hold indicia on the VSD, the hold indicia representing an instruction to repeat the holding pattern.

13. The method of claim 12, wherein the representing the holding pattern on the VSD further comprises depicting one or more hold fixes on the VSD, the one or more hold fixes representing one or more waypoints of the holding pattern.

14. The method of claim 12, wherein the representing the holding pattern on the VSD further comprises depicting an unwound flight path of the holding pattern on the VSD.

15. The method of claim 14, wherein the representing the holding pattern on the VSD further comprises showing a track distance of the unwound flight path on the VSD.

16. The method of claim 12, wherein the displaying the flight plan further comprises depicting at least one of atmospheric condition indicia, traffic indicia, or terrain feature indicia.

17. The method of claim 12, wherein the representing the holding pattern on the VSD further comprises:
  presenting a first portion of the flight plan associated with the holding pattern in a first screen area of the VSD; and
  presenting a second portion of the flight plan that is not associated with the holding pattern in a second screen area of the VSD.

18. The method of claim 12, further comprising displaying a weather alert indicia on the VSD, the weather alert indicia representing a severity and location of a weather condition proximate the flight path.

19. The method of claim 12, wherein the hold notification command is received as one or more of an audio, a visual, and a tactile feedback notification.

20. One or more computer-readable media storing computer executable instructions that, when executed on a computing device, perform the method as recited in claim 12.

* * * * *